US012141815B2

(12) United States Patent
van den Berg et al.

(10) Patent No.: US 12,141,815 B2
(45) Date of Patent: Nov. 12, 2024

(54) ENVIRONMENTAL IMPACT CORRECTION PLATFORM

(71) Applicant: PANASONIC INTELLECTUAL PROPERTY MANAGEMENT CO., LTD., Osaka (JP)

(72) Inventors: Jan Jasper van den Berg, London (GB); Matthew John Lawrenson, Chesterfield, MO (US)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 777 days.

(21) Appl. No.: 17/201,441

(22) Filed: Mar. 15, 2021

(65) Prior Publication Data
US 2021/0201329 A1     Jul. 1, 2021

Related U.S. Application Data

(63) Continuation of application No. PCT/JP2019/037392, filed on Sep. 24, 2019.
(Continued)

(51) Int. Cl.
*G06Q 30/018*     (2023.01)
*B60K 35/00*     (2024.01)
(Continued)

(52) U.S. Cl.
CPC .......... *G06Q 30/018* (2013.01); *B60K 35/00* (2013.01); *G01C 21/3859* (2020.08);
(Continued)

(58) Field of Classification Search
CPC ...... G06Q 30/018; G06Q 50/40; G06Q 10/20; G06Q 30/0284; G06Q 50/14;
(Continued)

(56) References Cited

U.S. PATENT DOCUMENTS

| 9,894,327 | B1* | 2/2018 | Jacob | ................... G05D 1/0094 |
| 2006/0287783 | A1* | 12/2006 | Walker | ..................... H04Q 9/00 |
| | | | | 701/31.4 |
| 2011/0320368 | A1 | 12/2011 | Corrigan et al. | |

FOREIGN PATENT DOCUMENTS

| CN | 103632539 A | * | 3/2014 |
| JP | 2002-083176 | | 3/2002 |

(Continued)

OTHER PUBLICATIONS

For Document CN 103632539 A (Year: 2014).*
(Continued)

*Primary Examiner* — Manish S Shah
*Assistant Examiner* — Sharad Timilsina
(74) *Attorney, Agent, or Firm* — Greenblum and Bernstein, P.L.C.

(57) ABSTRACT

A system and method for identifying an environmental impact by a vehicle and tracking of the environmental impact is disclosed. The method includes receiving, by the vehicle and from a mobile device of a passenger, a request for transportation. The method further includes acquiring, by the vehicle, environment data of a surrounding environment and vehicle attributes. The acquired data is then transmitted to a server for processing. The server, based on the transmitted data, determines journey attributes of a journey corresponding to the request for transportation. The server further determines environmental impact of the journey based on the environment data, the vehicle attributes, and the journey attributes, and assigns an asset identifier to an asset corresponding to the environmental impact.

14 Claims, 7 Drawing Sheets

Related U.S. Application Data

(60) Provisional application No. 62/735,234, filed on Sep. 24, 2018.

(51) Int. Cl.
| | |
|---|---|
| *B60K 35/28* | (2024.01) |
| *B64C 39/02* | (2023.01) |
| *B64D 47/08* | (2006.01) |
| *G01C 21/00* | (2006.01) |
| *G01S 19/42* | (2010.01) |
| *G01W 1/02* | (2006.01) |
| *G06F 16/23* | (2019.01) |
| *G06F 16/29* | (2019.01) |
| *G06Q 10/20* | (2023.01) |
| *G06Q 30/0283* | (2023.01) |
| *G06Q 50/14* | (2012.01) |
| *G06Q 50/40* | (2024.01) |
| *G07C 5/00* | (2006.01) |
| *H04L 9/32* | (2006.01) |
| *B64U 101/30* | (2023.01) |

(52) U.S. Cl.
CPC .......... *G06F 16/2379* (2019.01); *G06F 16/29* (2019.01); *G06Q 10/20* (2013.01); *G06Q 50/40* (2024.01); *G07C 5/008* (2013.01); *H04L 9/3239* (2013.01); *B60K 35/28* (2024.01); *B60K 2360/16* (2024.01); *B64U 2101/30* (2023.01); *G01S 19/42* (2013.01); *G01W 1/02* (2013.01); *G06Q 30/0284* (2013.01); *G06Q 50/14* (2013.01)

(58) Field of Classification Search
CPC . G06F 16/2379; G06F 16/29; G01C 21/3859; B60K 35/00; B60K 35/28; B60K 2360/16; B64C 39/024; B64D 47/08; G07C 5/008; H04L 9/3239; B64U 2101/30; G01S 19/42; G01W 1/02
See application file for complete search history.

(56) References Cited

FOREIGN PATENT DOCUMENTS

| | | |
|---|---|---|
| JP | 2004-185398 | 7/2004 |
| JP | 2010-218358 | 9/2010 |
| JP | 2011-221737 | 11/2011 |
| WO | 2014/016327 | 1/2014 |
| WO | WO-2014016327 A1 * | 1/2014 .......... B60L 15/2045 |

OTHER PUBLICATIONS

International Search Report (ISR) from International Searching Authority (European Patent Office) in International Pat. Appl. No. PCT/JP2019/037392, dated Nov. 28, 2019.

Written Opinion (WO) from International Searching Authority (European Patent Office) in International Pat. Appl. No. PCT/JP2019/037392, dated Nov. 28, 2019.

Office Action from Japan Patent Office (JPO) in Japanese Patent Appl. No. 2020-571893, dated Dec. 14, 2021, together with an English language translation.

* cited by examiner

ENVIRONMENTAL IMPACT CORRECTION PLATFORM

CROSS-REFERENCE TO RELATED APPLICATIONS

This application is a continuation of PCT International Patent Application No. PCT/JP2019/037392 filed on Sep. 24, 2019, which claims the benefit of priority of U.S. Provisional Patent Application No. 62/735,234 filed on Sep. 24, 2018, the entire contents of which are incorporated herein by reference.

FIELD

The present disclosure relates to determining an environmental impact of tourism, and securely facilitating a correction to the determined environmental impact.

BACKGROUND

Tourism is a significant and fast-growing sector in the global economy. It is often focused around specific areas of natural beauty, locations of cultural significance or historic architecture. However, large numbers of visitors can overburden the environment and infrastructure of the area of interest. This can occur through, for example, excessive traffic or people, increased pollution, damage to buildings or depletion of natural resources. Vehicles are also known to affect air quality and cause damage and discolor to buildings and infrastructure. Further, the way a vehicle is driven can affect the environment.

Damage to iconic monuments in India resulting from vehicle emissions is a known issue, and the city of Venice suffers significant structural and environmental damage as a result of the 30 million visitors it receives annually. Some countries or municipalities have introduced a tourist tax in order to recoup money from visitors, which can then be used to either repair damage or invest in infrastructure that lessens the effect of tourism on existing infrastructure and resources. Money can also be recouped through businesses that provide tourism industry-based products or services. These businesses can include a tourism levy in their pricing, which can then be recouped from the business through means such as rent or taxes. However, the high cost of such taxes and expensive products and services in tourist areas can cause visitors to feel dissatisfied with their experience, with fees averaging approximately $8 at locations globally and one extreme example seeing visitors charged up to $200 a day. Such fees can leave tourists with a feeling of being 'ripped of' by local authorities and businesses.

SUMMARY

The present disclosure relates to a system and method for determining an amount of environmental damage that may be caused based on a trip intended by a passenger or tourist. The present disclosure is further related to a system and method for generating and tracking tailored fees that will be applied for the determined environmental damage that is expected to be caused by the passenger or tourist based on the intended trip.

Aspects of the present disclosure provide a system and method for utilizing mobile assets, such as vehicles, drones or the like, to confirm whether a repair has been completed and identify any improvements in the environment or infrastructure that result from the repair.

Aspects of the present disclosure provide a system and method for providing reassurance to the tourist that the fee they are charged does in fact contribute to the repair to the damage resulting from their visit.

Aspects of the present disclosure provide a system and method for allowing property owners access to repair funds if their property has been damaged by tourism.

Aspects of the present disclosure include a method that include the following operations: vehicles moving around a location use their on-board sensors to gather data about the environment, themselves and other vehicles; the data is used to understand the effect of vehicle usage on the environment, and allows the impact of a specific vehicle and journey to be determined; a tourist travelling in a vehicle may therefore be billed for only the impact their travel has on the environment, for example based on the cost of previous repairs; and when the fee is paid a blockchain asset is created which may be tracked, allowing the final use of the money on environmental repairs to be checked and traced back to the tourist.

Further, non-limiting aspects of the present disclosure provide an ability to assess the environmental impact of a specific individual's travel within a location; an ability to calculate a fair and accurate fee to account for an individual's actual environmental impact on the environment in which they travel; an ability to track a tourist fee and verify that it has been used to repair the damage for which the fee was initially charged; and an ability to accurately determine the environmental impact of general vehicle usage on a specific location by utilising pre-existing sensors within vehicles to assess air, architecture and other effects.

Additionally, non-limiting aspects of the present disclosure may optionally include a method to automatically match environmental damage with a repair vendor, such that repairs may be initiated as and when required.

DETAILED DESCRIPTION

Figure 1:
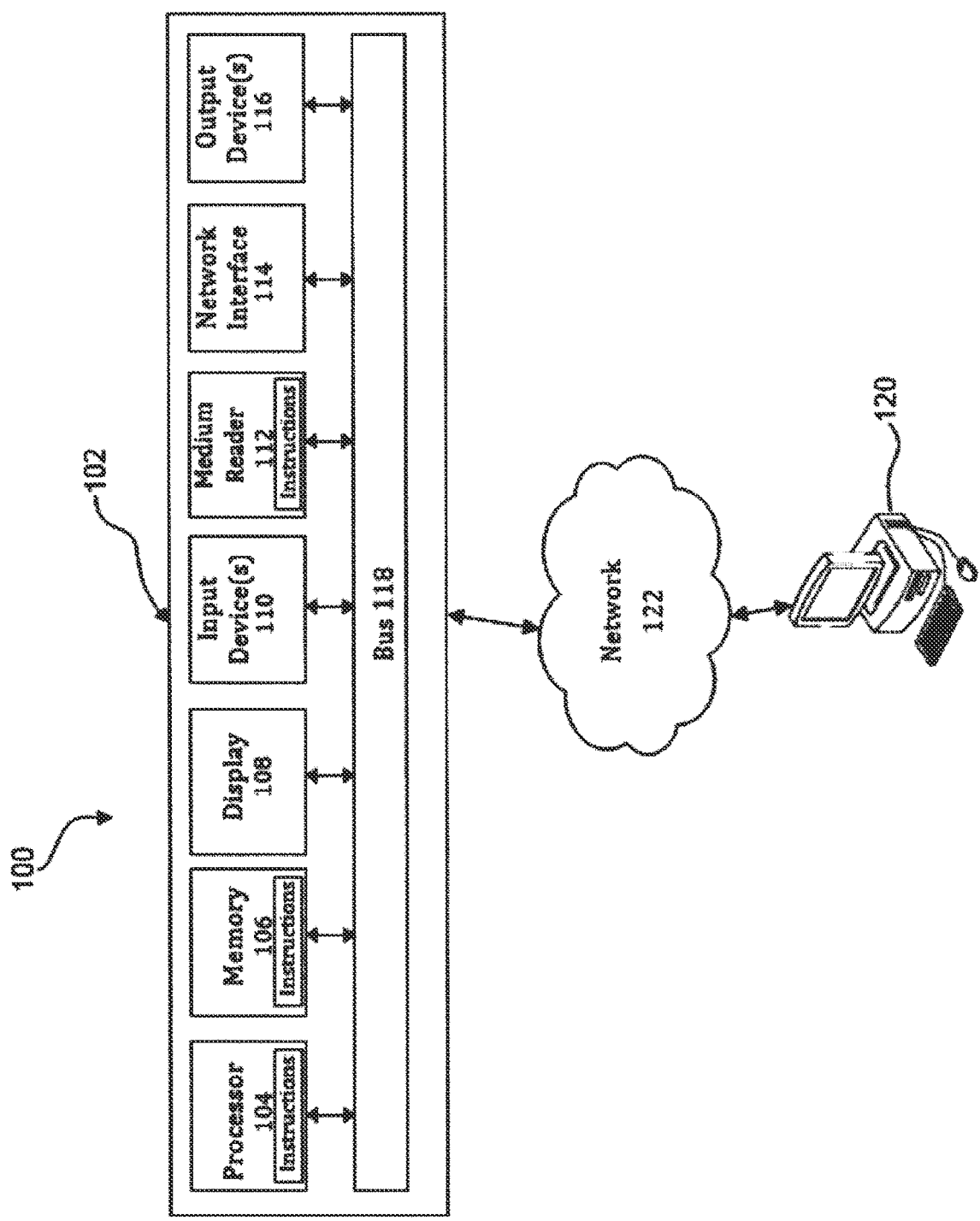
FIG. 1 shows an exemplary computer system, according to an aspect of the present disclosure.

In view of the foregoing, the present disclosure, through one or more of its various aspects, embodiments and/or specific features or sub-components, is thus intended to bring out one or more of the advantages as specifically noted below.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

FIG. 1 is an exemplary computer system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or subsystems that individually or jointly execute instructions or perform functions. The term "system" shall be taken throughout the present disclosure to include any collection of systems or subsystems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read anyone or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present disclosure, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
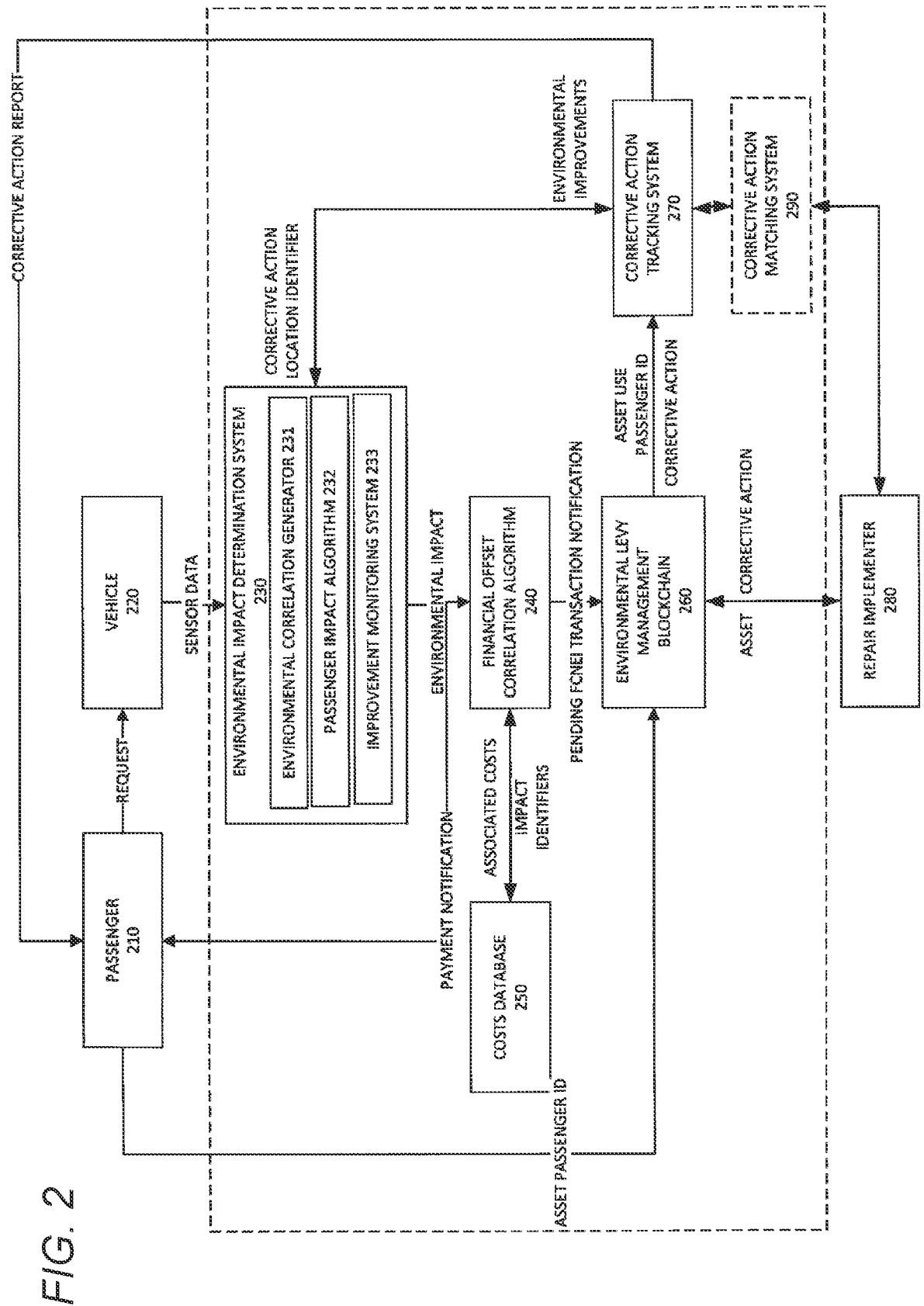
FIG. 2 shows an exemplary system for determining environmental impact by transportation, according to an aspect of the present disclosure.

FIG. 2 shows an exemplary system for determining environmental impact by transportation, according to an aspect of the present disclosure.

System 200 includes a passenger 210, a vehicle 220, an environmental impact determination system 230, a financial offset correlation algorithm 240, a costs database 250, an environmental levy management blockchain 260, a corrective action tracking system 270, and a repair implementer 280. The system 200 may optionally include a corrective action matching system 290. Although not illustrated, one or more of the passenger device 210, the vehicle 220, the environmental impact determination system 230, the financial offset correlation algorithm 240, the costs database 250, the environmental levy management blockchain 260, the corrective action tracking system 270, the repair implementer 280, and, optionally, the corrective action matching system 290 may be connected via one or more communication networks. In an example, one or more of the environmental impact determination system 230, the financial offset correlation algorithm 240, the costs database 250, the environmental levy management blockchain 260, the corrective action tracking system 270, the repair implementer 280, and the corrective action matching system 290 may reside in one or more network servers having at least a processor, a memory, and a transceiver. The one or more network servers may reside over a digital telecommunication network, a cloud network, or a combination of various computer networks.

The passenger 210 may be a tourist or visitor to a location who utilizes vehicular transportation over the duration of their visit. According to an aspect of the present disclosure, the passenger 210 may request or facilitate vehicular transportation using a mobile application, which may be installed on a mobile device (e.g., smart phone, smart watch, or other smart wearable devices) of the passenger 210. As illustrated in FIG. 2, the passenger 210 may broadcast a transportation request along with a location of the passenger 210 using his or her mobile device. Otherwise, the passenger 210 may opt to hail a vehicle via conventional methods.

In an example, the vehicular transportation may include, without limitation, private cars (owned or rented), hired vehicles (e.g., taxi, moped, minibus or similar motorized vehicle), and public transport. Further, the vehicular transportation may include vehicles with partial or full autonomous capabilities (e.g., self-parking to self-driving). The passenger 210 or corresponding passenger device may be assigned an identifier (e.g., Passenger ID) which can be used to uniquely identify and communicate with that passenger.

The vehicle 220 may refer to one or a group/fleet of vehicles involved in the environmental impact correlation platform, which may be used by one or more passengers to move around a location. Any vehicle with an appropriate sensor or suite of sensors and communication capabilities may participate in the environmental impact correlation platform. For example, suite of sensors may include, without limitation, a GPS sensor, a camera sensor, and a speed sensor. As illustrated in FIG. 2, sensor data collected by the vehicle 220 may be transmitted to the environmental impact determination system. However, aspects of the present disclosure are not limited thereto, such that the vehicle 220 may additionally transmit vehicle attribute information (e.g., weight, make, model, engine type, fuel type and other vehicle specification of the vehicle 220) and/or journey attribute information (e.g., distance to be traveled, average speed of travel expected based on speed limits and/or traffic information, final location, route type (highway vs. local roads), number of passengers and the like).

Vehicles which may not available for passenger use but possess appropriate sensing and communication systems may contribute sensor data to the system which may be used to monitor various information. For example, the vehicles unavailable for passenger use may include, without limitation, privately owned vehicles, motorcycles, unmanned robotic devices, unmanned aerial devices (e.g., drones), and other unmanned motorized devices. However, aspects of the present disclosure are not limited thereto, such that sensing information collected by stationary sensors, such as closed-circuit (CC) video cameras placed on various infrastructures, speed cameras placed on various roads, may additionally be utilized. Further, the various information being monitored may include, without limitation, ongoing environmental conditions, traffic information, road congestion information, and other pertinent information.

The environmental impact determination system 230 may be a system used to assess environmental effects of tourist vehicular movements within a certain geographic region. The environmental impact determination system 230 may calculate a correlation between a vehicle's speed, weight, distance, and other attributes with damage to air quality and/or damage to nearby infrastructure (e.g., via vibration caused during travel). For example, a petrol powered vehicle with high carbon dioxide emission may cause a greater damage to the air quality than a hybrid passenger vehicle with minimal carbon dioxide emission. Further, traveling through a congested urban street may have a higher correlation with damage to the air quality than traveling through country side. Also, vehicles travelling at higher speeds may also have a higher correlation with damage to the air quality than vehicle traveling at lower speeds. Accordingly, in view of various attributes associated with the vehicle 220 and attributes associated with a journey by the passenger 210 in the vehicle 220, the environmental impact determination system 230 may calculate a unique or tailored environmental damage that may be caused by a journey by the passenger 210 when traveling in the vehicle 220. As illustrated in FIG. 2, the environmental impact determination system 230 may transmit the calculated environmental impact or damage information to a financial offset correlation algorithm 240.

In an example, the environmental impact determination system 230 may operate via three subsystems, including an environmental correlation generator 231, the passenger impact algorithm 232, and improvement monitoring system 233.

The environmental correlation generator 231 may be a subsystem that analyses input (or sensor data) provided by one or more sensors provided on the vehicle 220 or distributed over a fleet of vehicles 220 to develop a computer model indicating correlative relationships between vehicle usage and environmental impact, or vehicle usage effects. Further, the computer model indicating correlative relationship between the vehicle usage and the environmental impact may be updated intermittently or in real-time via machine learning and/or artificial intelligence. For example, as environmental conditions change with respect to time, an amount of air pollution causing a particular level of environmental damage may change.

In an example, the sensor data may include, without limitation, environmental data and vehicle data. Environmental data may include data on environmental effects, such as air quality, structural degradation, building facade color changes, road degradation and the like obtained through the use of camera systems and other methods. Vehicle data may include speed and location from the vehicle transporting the passenger 210 and other vehicles of the vehicle fleet it meets. The environmental impact or effects of vehicle usage may be determined through the use of various algorithms, such as damage analysis algorithms. The damage analysis algorithms may include, without limitation, image processing algorithms, sensor analysis algorithms, and other analysis processes. In an example, the damage analysis algorithm may attribute certain amount of environmental damage to one or more of pieces of the vehicle data. For example, the damage analysis algorithm may attribute variable amount of environmental damage to the expected/actual speed of the vehicle, weight of the vehicle, engine type of the vehicle, expected/actual distance of travel by the vehicle, and the like. Further, the damage analysis algorithm may attribute certain amount of environmental damage based on one or more pieces of the environmental data collected. For example, the damage analysis algorithm may attribute certain amount of environmental damage to a particular weather condition, air quality condition, traffic conditions, and the like.

The passenger impact algorithm 232 may be a subsystem that analyzes received input from a specific vehicle, such as a target vehicle, to determine the target vehicle's impact on the environment during a specific journey taken by a passenger. The target vehicle's impact may be referred to as an environmental impact. The environmental impact may be determined using, for example, vehicle usage effects determined by the environmental correlation generator 231, journey attributes, and vehicle model information. The journey attributes may refer to information relating to a journey taken by the passenger 210 and captured by the target vehicle's sensor suite. The journey attributes may include, without limitation, distance traveled, speed and payload. The vehicle model information transmitted by the target vehicle may be referred to as vehicle characteristics, such as propulsion method, engine size, emission characteristics and the like.

The environmental impact may be subdivided by an impact type or impact identifiers to facilitate the correlation of damage with repair costs. In an example, the impact type may include, without limitation, air quality impact, facade damage, structural damage, road damage, and the like. For example, an impact identifier may relate to air quality, facade damage, or any other effect. As illustrated in FIG. 2, the financial offset correlation algorithm 240 may transmit impact identifiers to the costs database 250, and the cost database 250 may provide associated cost information for determining costs associated with the impact identifiers.

The improvement monitoring system 233 may be a subsystem that tracks effects of any restorative measures, or corrective action(s), which may have been enacted to repair existing environmental damage. For example, restorative measures may include, projects directed to reducing carbon emissions (e.g., clean energy), cosmetic/constructive work performed on various landmarks and structures, repairs performed on roads of iconic geographical areas and the like. In another example, restorative measures or corrective action may use a vehicle provided with an air cleaner to be driven within a location with low air quality. Locations at which corrective action(s) have been employed (or assigned to be employed) may be tagged with an identifier, and may be referred to as a location identifier. The location identifier may be used to track any environmental improvements. The environmental improvements may be tracked via sensor data of various vehicles that may be travelling around the location where the environmental improvement work has been performed. However, aspects of the present disclosure are not limited thereto, such that evidence of the environmental improvements may be provided by the repair implementer 280 performing the repair work, acquired by government agent, or acquired via unmanned aerial devices, such as drones with imaging capabilities.

The financial offset correlation algorithm 240 may be an algorithm that determines an appropriate financial reparation to account for the environmental impact of a journey taken by the passenger 210. The appropriate financial reparation may be referred to as financial cost to negate the environmental impact (FCNEI). The FCNEI may be a specific levy applied to a passenger that allows that passenger to be charged only for the calculated environmental impact resulting from their own movements. The FCNEI may be calculated using the environmental impact calculated by the environmental impact determination system 230 and cost information stored in a cost database 250 relating to financial expenditure on environmental repairs tagged by an impact identifier.

The stored information may include, without limitation, (i) previous repairs and historical expenditure related to negative environmental effects, and (ii) updated quotes and projected costs obtained from merchants relating to future repairs. When the financial offset correlation algorithm 240 calculates the FCNEI payment associated with the travel of the passenger 210, the system may automatically generate: (i) an additional charge which is paid at the time of disembarking the vehicle; (ii) a notification for later payment; and (iii) an alternative payment trigger. However, aspects of the present disclosure is not limited thereto, such that the financial offset correlation algorithm 240 may calculate an estimated FCNEI payment associated with an intended trip of the passenger 210 and transmit the estimated FCNEI payment to the passenger 210, such that the passenger 210 may be aware of such charges before the passenger 210 takes the journey via the vehicle 220.

As illustrated in FIG. 2, a payment notification may generated by the financial offset correlation algorithm 240 and transmitted to the passenger 210. The payment notification may refer to actual FCNEI payment paid/due by the passenger 210, expected FCNEI payment based on the planned travel, or the like.

Further, the financial offset correlation algorithm 240 may also notify the environmental levy management blockchain 260 of a pending FCNEI transaction.

The environmental levy management blockchain 260 may be a blockchain ledger used to record and store FCNEI transactions.

Blockchain technology can provide a record of how an asset is passed through a system, which may be applied to track transfer of financial and physical assets. In a blockchain system, the ownership of an asset can be traced from its creation to a current owner. The ability to track a chain of ownership allow for broad application of the blockchain technology, such as in the charities sector, as they allow a donor to track their donation to its final use for a charitable cause. Accordingly, the blockchain technology may provide the donor with a level of assurance by allowing the donor to verify that their contribution has been used for the purpose it was intended. Further, the blockchain systems may be used to track how money is used across a range of financial applications. For example, the government of United Kingdom is considering the use of blockchain to track how taxpayer money is used to fund research grants, student loans and other causes. Accordingly, the blockchain technology may also be applied to monitor how individuals receiving welfare payments use the money they receive, to prevent fraud and potentially limit non-essential purchases such as alcohol and luxury foods. Although the blockchain technology has been utilized for purposes of tracking of new digital currencies, such as bitcoin, aspects of the present disclosure are not limited thereto, such that the blockchain may be utilized to implement money transfer systems that are not based on the new digital currencies, and instead tracking using existing currencies for its transactions.

Generally, a blockchain is a distributed database that stores a set of records organized into blocks. Each block is timestamped and linked to previous blocks via a method that is resistant to the modification of previous blocks.

Blockchains may be decentralized, peer-to-peer networked databases that may be configured to store and authenticate a ledger of data and data transactions. The blockchain technology may facilitate transactions without a third-party intermediary, which may be instead validated by consensus. As new blocks are added the difficulty to modify previous blocks increases, with the aim that, after several new blocks have been added, it will become unjustifiable to do so, even for malicious purposes. Hence, if designed well, even though no central authority manages the blockchain, the validity of data can be trusted by all, as it becomes impractical to modify it for malicious purposes, hence it becomes irrefutable. This contrasts with traditional centralized servers or databases, where change processes often exist in order to control changes within the database, but if those processes are either followed or bypassed the data may be changed in an undetectable manner.

When the passenger 210 provides payment for the FCNEI levy associated with the passenger's activity or activities, an associated FCNEI asset is created on the environmental levy management blockchain 260. Further, the passenger 210 may provide, via a mobile device, an asset passenger ID to the environmental levy management blockchain 260. In an example, the FCNEI levy may be paid via a fiat or digital currency. Once the FCNEI asset is stored on the environmental levy management blockchain 260, the FCNEI asset may be tracked through any number of transactions. The FCNEI assets obtained by the environmental impact determination system 230 may be intended to be used in the implementation of corrective actions that are linked to the damage caused by the environmental impact associated with movements of the passenger 210. Further, the FCNEI asset may be tagged with the asset passenger ID, enabling the FCNEI asset to be traced back to the passenger 210 and allowing the passenger 210 to be notified of its use. Optionally, the FCNEI asset may be submitted to the environmental levy management blockchain 260 in multiple varieties of digital currency, rather than a single type. These multiple varieties of digital currency could be linked to the impact identifiers to represent different types of environmental damage. The FCNEI asset may be transferred via the environmental levy management blockchain 260 to an individual or organization (e.g., repair implementer 280) as payment for a corrective action. When the FCNEI asset is transferred to the repair implementer 280, the transaction is tagged with the intended/performed corrective action. In an example, the FCNEI asset may be transferred prior to or after execution of the corrective action. Further, the repair implementer 280 may provide the environmental levy management blockchain 260 with status of the corrective action performed by the repair implementer 280.

The environmental levy management blockchain 260 may further provide the asset use passenger ID and information of the corrective action performed/intended/tracked to the corrective action tracking system 270.

The corrective action tracking system 270 may be a system that monitors implementation and effects of corrective actions that are applied in response to the environmental damage associated with the passenger 210. The corrective action tracking system 270 may monitor the environmental levy management blockchain 260 to identify corrective actions to be performed as they are initiated through an asset transaction. Each corrective action may be associated with a number of assets obtained over a period of time in response to the same or similar impact identifiers. The corrective action tracking system 270 may use a corrective action location identifier to query the improvement monitoring system 233 to receive information on any environmental improvement which may have occurred as a result of the applied corrective action. Based on the information provided by the improvement monitoring system 233, the corrective action tracking system may generate a passenger report, which may be sent to all passengers whose assets were used to initiate the corrective action. The passenger report may detail a specific environmental improvements or repairs that are a direct result of the passenger's FCNEI contribution.

The corrective action matching system 290 may be a system which may identify any corrective action required to repair cumulative environmental damage and match that corrective action with a repair implementer capable of remedying it. In such a scenario, repair implementers 280 may enroll to be considered for corrective action assignments, and may be vetted to ensure that the service that they provide to an appropriate standard. The details of the vetted repair implementers may be stored in a database, such as a repair implementer database, for access as required.

In an example, the corrective action matching system 290 may communicate with the corrective action tracking system 270 and the repair implementer(s) 280 to coordinate activities for performing repair of cumulative environmental damage.

Figure 3:
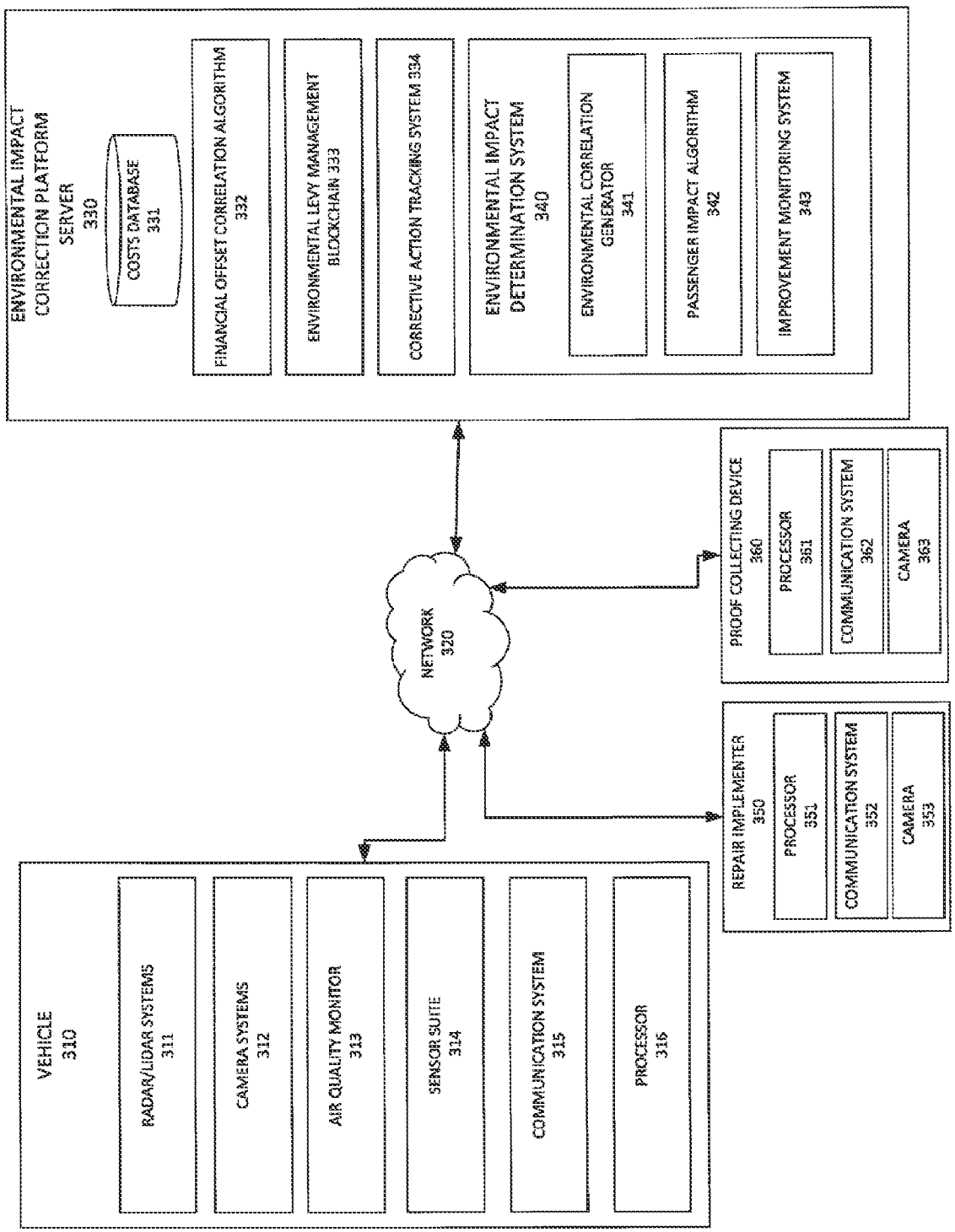
FIG. 3 shows an exemplary network environment for determining environmental impact by transportation, according to an aspect of the present disclosure.

FIG. 3 shows an exemplary network environment for determining environmental impact by transportation, according to an aspect of the present disclosure.

The network environment of FIG. 3 includes a vehicle 310, a network, 320, an environmental impact correction platform server 330, a repair implementer 350, and a proof collecting device 360. Although a single instance of each of the vehicle 310, the network 320, the environmental impact correction platform server 330, the repair implementer 350 and the proof collecting device 360 is illustrated, aspects of the present disclosure are not limited thereto, such that multiples of each of the vehicle 310, the network 320, the environmental impact correction platform server 330, the repair implementer 350 and the proof collecting device 360 may be present in implementation.

The vehicle 310 includes RADAR/LIDAR systems 311, camera systems 312, an air quality monitor 313, a sensor suite 314, a communication system 315, and a processor 316.

The RADAR/LIDAR systems 311 may include various actuators and light detection and ranging system, which allows three-dimensional detection of structures surrounding the vehicle 310. The RADAR/LIDAR systems 311 may provide the vehicle 310 with sensed data relating to various buildings, landmarks, bridges, and other structural objects giving an indication of location of the vehicle 310.

The camera systems 312 may include one or more cameras provided on the vehicle 310, which may be utilized to capture various images of an environment surrounding the vehicle 310. In an example, the camera systems 312 may capture one or more images of surrounding buildings or roads to determine a state of the observed structures. Pixel values of a particular structure included in the captured images may be compared with a reference stored image of the particular structure for assessing a level of environmental impact or damage levied thereto. Further, the camera systems 312 may be further utilized to verify corrective action performed on a damaged structure by a repair implementer.

The air quality monitor 313 may detect air quality of its surrounding environment. The air quality monitor 313 may determine a current status of the air quality and transmit detection of the air quality to the environmental impact correction platform server 330, via the network 320. In an example, the detected air quality may provide a base line for determining an environmental impact that would be caused by a trip intended by a passenger via the vehicle 310.

The sensor suite 314 may include, without limitation, a GPS sensor, an emission sensor and a speed sensor. The GPS sensor may provide location information of the vehicle 310, as well as intended travel route of the vehicle 310. The location information and the travel route information of the vehicle 310 may be transmitted to the environmental impact correction platform server 330. The provided information may be utilized to adjust environmental impact of the planned journey by the passenger. For example, if the journey originates and terminates in a rural area with good air quality, it may be determined that the environmental impact of such a journey would be limited. The speed sensor may indicate an expected or actual travel speed expected to be incurred during the journey. In an example, the expected travel speed may be determined based on speed limits along the planned travel route as well as traffic information. At least since the amount of vehicle emission may be speed dependent, speed of travel may modify an environmental impact caused by the vehicle 310. The emission sensor may provide an actual emission outputted by the vehicle during a trip, which may be different from the expected emission output as driving style (e.g., quick acceleration) may increase emission output.

The communication system 315 may include a transmitter to transmit various information from the vehicle 310 to the environmental impact correction platform server 330 via the network 320. The transmitter may also transmit various information from the vehicle 310 to a mobile device of a passenger for facilitating ride scheduling and payment processing. The communication system 315 may also include a receiver to receive various information from the mobile device of the passenger and/or the environmental impact correction platform server 330.

The vehicle may additionally include a processor 316 for processing various sensor data, and/or information received from the environmental impact correction platform server 330.

The network 320 may be, but is not limited to, a local area network, a wide area network, a cloud network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 320 which are known and understood may additionally or alternatively be used and that the exemplary networks 320 are not limiting or exhaustive.

The environmental impact correction platform server 330 may be configured as a single server or a system of servers. In an example, a server implementing the environmental impact correction platform server 330 may have a configuration similar to the computer system 102. In an example, the environmental impact correction platform server 330 may reside in one or more network servers having at least a processor, a memory, and a transceiver. The one or more network servers may reside over a digital telecommunication network, a cloud network, or a combination of various computer networks.

The environmental impact correction platform server 330 includes a costs database 331, a financial offset correlation algorithm 332, an environmental levy management blockchain 333, a corrective action tracking system 334, and an environmental impact determination system 340. In an example, one or more of the components included in the environmental impact correction platform server 330 may be implemented by a processor, an integrated circuit, and/or memory of the server implementing the environmental impact correction platform server 330.

According to aspects of the present disclosure, the costs data base 331 may be configured similarly to the costs database 250. In an example, the costs database 331 may be a memory stored in a server implementing the environmental impact correction platform server 330. However, aspects of the present disclosure are not limited thereto, such that the costs database 331 may be provided in a separate server residing in the same or different network. The financial offset correlation algorithm 332 may be configured similarly to the financial offset correlation algorithm 240. The financial offset correlation algorithm 332 may be stored in a memory (not illustrated) and executed by a processor (not illustrated) of the server implementing the environmental impact correction platform server 330. The environmental levy management blockchain 333 may be configured similarly to the environmental levy management blockchain 260. The corrective action tracking system 334 may be configured similarly to the corrective action tracking system 270. The environmental impact determination system 340 may be configured similarly to the environmental impact determination system 230.

The environmental impact determination system 340 includes an environmental correlation generator 341, a passenger impact algorithm 342, and an improvement monitoring system 343. The environmental correlation generator 341 may be configured similarly to the environmental correlation generator 231. The passenger impact algorithm 342 may be configured similarly to the passenger impact algorithm 232. Further, in an example, the passenger impact algorithm 342 may be stored in the memory and stored by the processor of the server implementing the environmental impact correction platform server 330. The improvement monitoring system 343 may be configured similarly to the improvement monitoring system 233.

Although a single vehicle 310 is illustrated, aspects of the present disclosure is not limited thereto, such that multiple vehicles belonging to the same fleet or different fleet may be contemporaneously communicating with the environmental impact correction platform server 330. Further, although not illustrated, vehicles of a same fleet may communicate with the environmental impact correction platform server 330 via a centralized server.

The repair implementer 350 may be configured similarly with the repair implementer 280. Further repair implementer 350 includes a processor 351, a communication system 352, and a camera 353. In an example, the repair implementer 350 may be a mobile computing device of a contractor that is retained to perform various repair work of damage incurred by the changing environment, which may be caused by heavy tourism. The repair implementer may communicate with the environmental impact correction platform server 330 to receive instructions for performing various repair work to alleviate or undo the damage incurred. Upon completion of the repair work, the repair implementer 350 may transmit a notification of completion of work to the environmental impact correction platform server 330. Further, the repair implementer 350 may capture images of the completed repair work as evidence of work performed.

If the performance of the contractor is deemed satisfactory, the environmental impact correction platform server 330 may transfer a portion of the FCNEI assets collected from various passengers and tagged with corresponding passenger IDs to the repair implementer 350. The FCNEI asset may be transferred via the environmental levy management blockchain 333 to the repair implementer as payment for the repair work performed. Upon transfer of the FCNEI assets, the environmental impact correction platform server 330 may also notify the passengers associated with the passenger IDs tagged to the FCNEI assets of the work performed.

If the environmental impact correction platform server 330 is unable to determine whether the work performed by the repair implementer 350 is satisfactory, the environmental impact correction platform server 330 may instruct the proof collecting device 360 to obtain additional evidence. In an example, the proof collecting device 360 may be a vehicle equipped with sensing technology within a reference distance of a location at which the proof is to be collected, or an unmanned aerial device (e.g., a drone) equipped with sensors for collecting of proof of work. The proof collecting device 360 includes a processor 361, a communication system 362 and a camera 363. However, aspects of the present disclosure are not limited thereto, such that the proof collecting device 360 may also be equipped with sample collection device, which may obtain an air sample, water sample, or other samples for further study and/or analysis. Further, the environmental impact correction platform server 330 may deploy the proof collecting device 360 upon notification of completion is received from the repair implementer 350.

Figure 4:
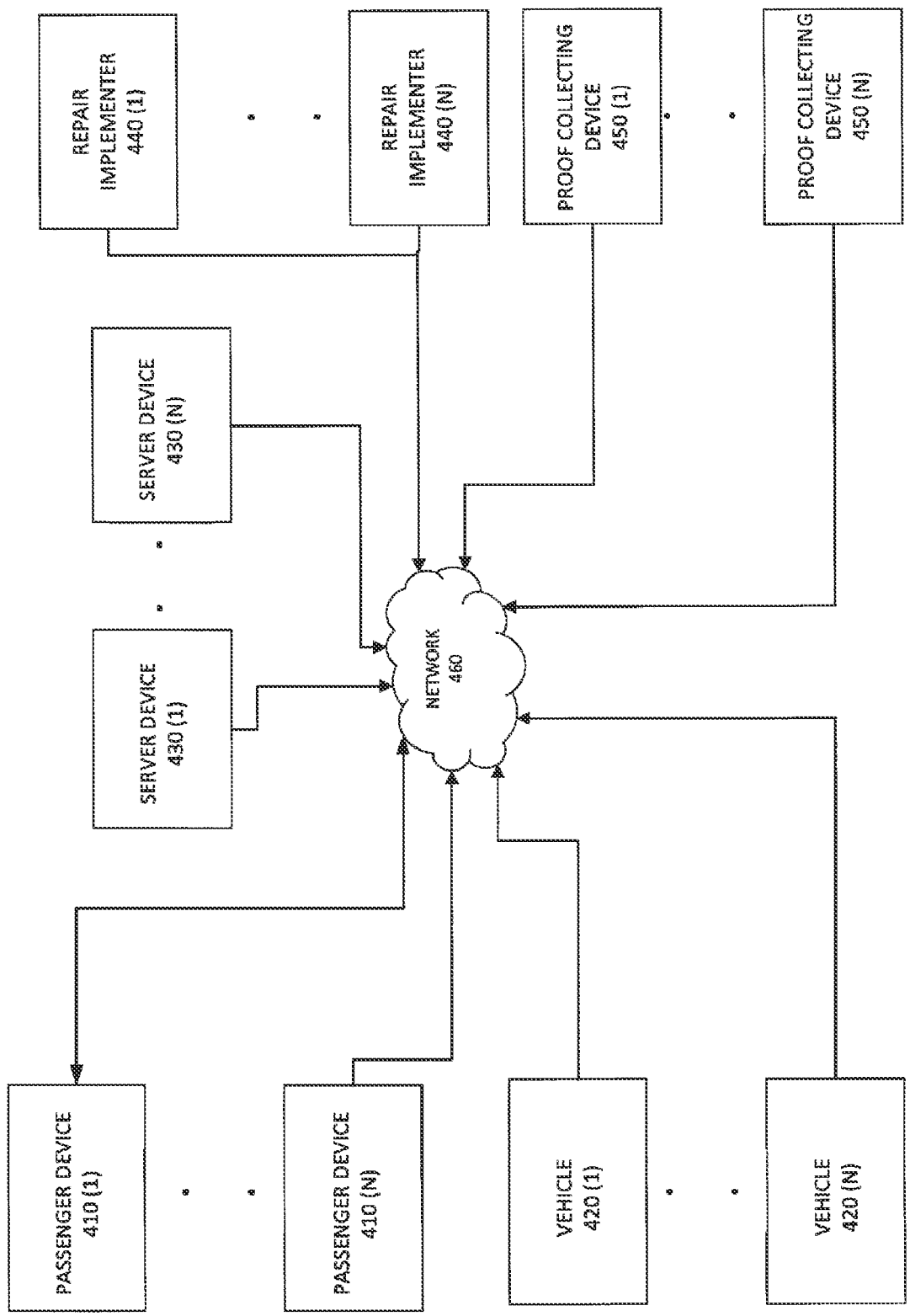
FIG. 4 shows an exemplary network environment for determining an environmental impact of a journey and secure transferring of assets for addressing the environmental impact, according to an aspect of the present disclosure.

Referring to FIG. 4, a schematic of an exemplary network environment for determining an environmental impact of a journey and secure transferring of assets for addressing the environmental impact is illustrated. In an exemplary embodiment, the above described framework is executable on a networked computer platform.

In the network environment of FIG. 4, a plurality of passenger devices 410(1)-410(N), a plurality of vehicles 420(1)-420(N), a plurality of server devices 430(1)-430(N), a plurality of repair implementers 440(1)-440(N), and a plurality of proof collecting devices 450(1)-450(N) may communicate via communication network(s) 460. According aspects of the present disclosure, each of the server devices 430(1)-430(N) may host or include one or more components of the environmental impact correction platform server 330 of FIG. 3.

A communication interface of a client device, such as the network interface 114 of the computer system 102 of FIG. 1, operatively couples and communicates between the passenger device, the vehicles 420(1)-420(N), the server devices 430(1)-430(N), the repair implementers 440(1)-440(N), and/or the proof collecting devices 450(1)-450(N), which are all coupled together by the communication network(s) 460, although other types and/or numbers of communication networks or systems with other types and/or numbers of connections and/or configurations to other devices and/or elements may also be used.

The communication network(s) 460 may be the same or similar to the network 122 as described with respect to FIG. 1, although the vehicles 420(1)-420(N), the server devices 430(1)-430(N), the repair implementers 440(1)-440(N), and/or the proof collecting devices 450(1)-450(N) may be coupled together via other topologies. Additionally, the network environment of FIG. 4 may include other network devices such as one or more routers and/or switches, for example, which are well known in the art and thus will not be described herein.

By way of example only, the communication network(s) 460 may include local area network(s)(LAN(s)) or wide area network(s)(WAN(s)), and can use TCP/IP over Ethernet and industry-standard protocols, although other types and/or numbers of protocols and/or communication networks may be used. The communication network(s) 460 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The plurality of the server devices 430(1)-430(N) may be the same or similar to the computer system 102 or the computer device 120 as described with respect to FIG. 1, including any features or combination of features described with respect thereto. For example, any of the server devices 430(1)-430(N) may include, among other features, one or more processors, a memory, and a communication interface, which are coupled together by a bus or other communication link, although other numbers and/or types of network devices may be used. The server devices 430(1)-430(N) in this example may process requests received from a computing device via the communication network(s) 460 according to the HTTP-based and/or JavaScript Object Notation (JSON) protocol, for example, although other protocols may also be used.

The server devices 430(1)-430(N) may be hardware or software or may represent a system with multiple server devices in a pool, which may include internal or external networks. The server devices 430(1)-430(N) are configured to receive, generate and store, without limitation, sensor data from vehicles, environmental impact of trips by the vehicles, impact identifiers of trips by the vehicles, costs associated with the trips, FCNEI assets from passenger devices, passenger identifiers tied to the FCNEI assets, corrective action items, and tracking of environmental improvements.

Although the server devices 430(1)-430(N) are illustrated as single devices, one or more actions of each of the server devices 430(1)-430(N) may be distributed across one or more distinct network computing devices that together comprise one or more of the server devices 430(1)-430(N). Moreover, the server devices 430(1)-430(N) are not limited to a particular configuration. Thus, the server devices 430(1)-430(N) may contain a plurality of network computing devices that operate using a master/slave approach, whereby one of the network computing devices of the server devices 430(1)-430(N) operates to manage and/or otherwise coordinate operations of the other network computing devices.

The server devices 430(1)-430(N) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of passenger devices 410(1)-410(N), and/or the plurality of repair implementers 440(1)-440(N) may also be the same or similar to the computer system 102 or the computer device 120 as described with respect to FIG. 1, including any features or combination of features described with respect thereto. For example, the passenger devices 410(1)-410(N) and/or the repair implementers 440(1)-440(N) in this example may include any type of computing device that can facilitate the execution of a web application or analysis that relates to an API. Accordingly, the passenger devices 410(1)-410(N) and/or the repair implementers 440(1)-440(N) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one passenger device 410 and/or one repair implementer is a wireless mobile communication device, i.e., a smart phone.

The passenger devices 410(1)-410(N) and/or the repair implementers 440(1)-440(N) may run interface applications, such as standard web browsers or standalone client applications, which may provide an interface to communicate with one or more of the vehicles 420(1)-420(N) and/or one or more of the server devices 430(1)-430(N) via the communication network(s) 460 in order to communicate user requests. The passenger devices 410(1)-410(N) and/or the repair implementers 440(1)-440(N) may further include, among other features, a display device, such as a display screen or touchscreen, and/or an input device, such as a keyboard, for example.

Although the exemplary network environment of FIG. 2 with the passenger devices 410(1)-410(N), the vehicles 420(1)-420(N), the server devices 430(1)-430(N), the repair implementers 440(1)-440(N), and the proof collecting devices 450(1)-450(N), and the communication network(s) 460 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment of FIG. 2, such as the server devices 430(1)-430(N) or the passenger devices 410(1)-410(N), for example, may be configured to operate as virtual instances on the same physical machine. In other words, one or more of the server devices 430(1)-430(N) or the passenger devices 410(1)-410(N) may operate on the same physical device rather than as separate devices communicating through communication network(s) 460.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs) the Internet, intranets, and combinations thereof.

Figure 5A:
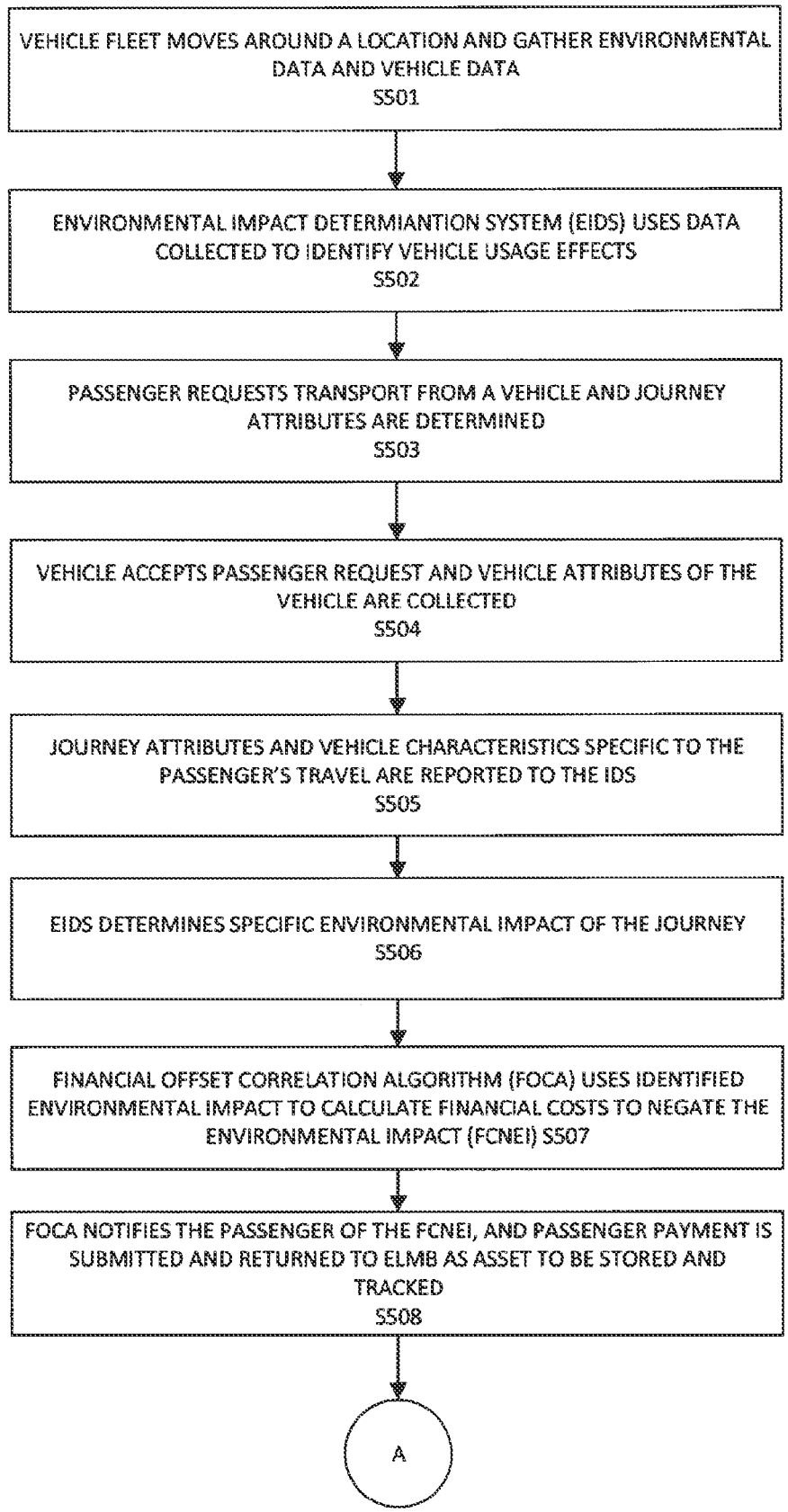
FIG. 5A shows a method for determining an environmental impact of a journey by a vehicle and tracking of assets for correcting the environmental impact, according to aspects of the present disclosure.
Figure 5B:
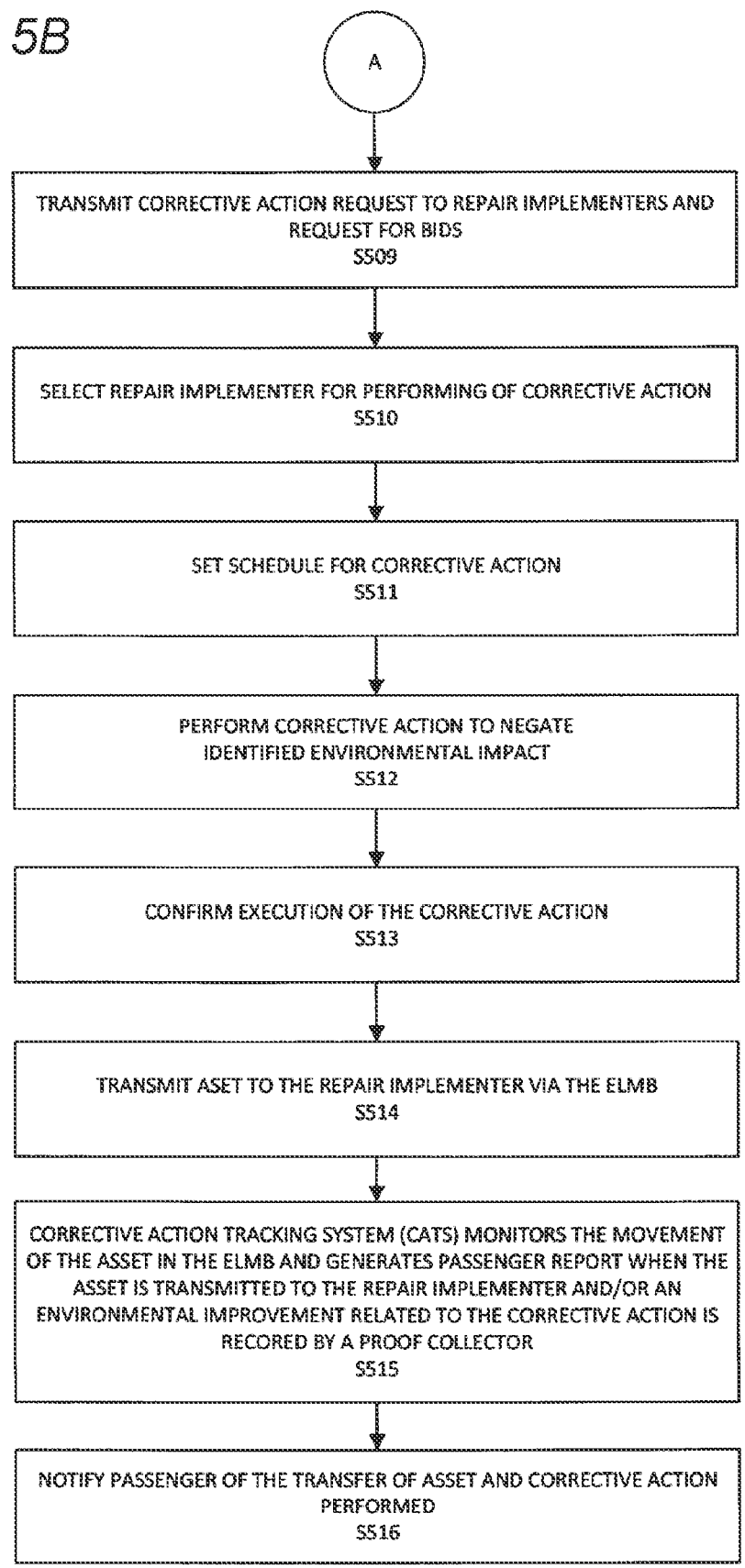
FIG. 5B shows a method for determining an environmental impact of a journey by a vehicle and tracking of assets for correcting the environmental impact, according to aspects of the present disclosure.

FIGS. 5A-5B show a method for determining an environmental impact of a journey by a vehicle and tracking of assets for correcting the environmental impact, according to aspects of the present disclosure.

In operation S501, one or more vehicles moves around a location and gather environmental data. The one or more vehicles may be designated to transportation of passengers. In an example, the one or more vehicles may belong to a vehicle fleet or may operate independently. As a vehicle of the vehicle fleet travels it collects sensor data using its onboard sensor suite. The sensor suite may include, without limitation, one or more cameras, air quality sensor. RADAR/LIDAR, a speed sensor, a GPS sensor, water quality sensor, and the like. However, aspects of the present disclosure are not limited thereto, such that the vehicle may also utilize external sensors that may be wirelessly connect with the vehicle. The external sensors may be attached to a fixed structure, such as a traffic light, light posts, and buildings. The external sensors may include, without limitation, a speed sensor, security cameras, air quality sensors, and the like. Further, the external sensors may be attached to mobile devices, such as unmanned aerial vehicles (e.g., drones).

The environmental data collected by the one or more sensors of the sensor suite of the vehicle may include air quality, weather conditions, building facade color condition, road condition, and the like. However, aspects of the present disclosure are not limited thereto, such that the environmental data additionally may include dates of particular events, such as concerts, sporting events, and the like. The sensor data may be transmitted to an environmental impact determination system. The sensor data may also be used by an environmental correlation generator to produce and update vehicle usage effects.

In operation S502, an environmental impact determination system receives the sensor data collected by the vehicle and analyzes the sensor data to determine vehicle usage effects. In an example, the environmental impact determination system may be a system used to assess environmental effects of vehicular movements within a certain geographic region based on a current environmental condition. The environmental impact determination system may calculate a correlation between vehicle emission or other byproducts to air quality and/or damage to nearby infrastructure (e.g., via vibration caused during travel).

In addition, the environmental impact determination system may additionally factor in the current environmental condition in the determining of the vehicle usage effects. For example, vehicle usage effects may be elevated when the air quality is particularly bad on the day or the time of travel. Further, when the day or time of travel falls within performance of a particular event (e.g., concert, sporting events, or other large gatherings), the vehicle usage effects may be expected to be further elevated. In view of such considerations, the environmental impact determination system may determine expected vehicle usage effects.

In operation S503, a passenger requests transport from the vehicle or the vehicle fleet and journey attributes are determined based on the passenger request. In an example, the request may be transmitted to a particular vehicle fleet or may be broadcasted to various vehicles and/or vehicle fleet within a reference distance of the passenger. In an example, the passenger may request the transport using a mobile device (e.g., smart phone, smart watch, or other mobile computing device), by phone, manually hailing the vehicle, by appointment via a computer, or the like. According to aspects of the present disclosure, the request for transportation may specify, without limitation, a pick up location, a destination, preferred route (e.g., fastest route, local route, fastest time, usage of toll roads and etc.), a number of passengers and the like. Based on the passenger request, journey attributes of the requested transportation may be determined. For example, based on the destination, calculated route information and traffic information, an average speed of travel, distance of travel, time of travel and the like may be determined for the requested travel.

In operation S504, a vehicle or a vehicle fleet accepts the passenger request and assigns a vehicle to the passenger, and vehicle attributes of the assigned vehicle are collected. In an example, the vehicle attributes may include, without limitation, weight, make/model, engine size, engine type, fuel type and other attributes. One or more of the vehicle attributes may have modified impact on the environment. For example, a petrol powered vehicle with high carbon dioxide emission may cause a greater damage to the air quality than a hybrid passenger vehicle with minimal carbon dioxide emission. Further, vehicles with larger engine size with less fuel efficiency may emit higher levels of carbon dioxide and other harmful emission to the air.

In operation S505, the journey attributes and the vehicle attributes specific to the passenger's travel are reported to the environmental impact determination system over a communication network. Although the journey attributes and the vehicle attributes are illustrated as being transmitted in a single step, aspects of the present disclosure are not limited thereto. In an example, the journey attributes and the vehicle attributes may be transmitted contemporaneously or separately. The journey attributes and the vehicle attributes may be transmitted by the assigned vehicle or a corresponding vehicle fleet. Further, journey attributes and/or the vehicle attributes may be transmitted from the mobile device of the passenger.

In operation S506, the environmental impact determination system determines environmental impact of the journey to be taken by the passenger using the assigned vehicle. The environmental impact determination system may calculate a specific correlation between the assigned vehicle's attributes with damage to air quality and/or damage to nearby infrastructure (e.g., via vibration caused during travel) based on the journey attributes of the passenger. For example, if the assigned vehicle is a hybrid passenger vehicle with minimal carbon dioxide emission, the assigned vehicle may be expected to cause less environmental damage than a petrol powered vehicle. Further, traveling through a congested urban street may have a higher correlation with damage to the air quality than traveling through country side. Also, vehicles travelling at higher speeds (e.g., if the planned route is expected along a highway) may also have a higher correlation with damage to the air quality than vehicle traveling at lower speeds. Accordingly, in view of various attributes associated with the vehicle and attributes associated with a journey by the passenger in the vehicle, the environmental impact determination system may calculate a unique or tailored environmental damage that may be caused by a journey by the passenger when traveling in the assigned vehicle.

In operation S507, a financial offset correlation algorithm, which may be stored in a memory of a server and executed by a processor of the server, uses the unique or tailored environmental impact associated with the planned journey by the passenger in the assigned vehicle to calculate financial cost to negate the unique or tailored environmental impact (FCNEI) associated with the planned journey. In an example, the financial offset correlation algorithm may be an algorithm that determines an appropriate financial reparation to account for the environmental impact of a journey taken by the passenger. The appropriate financial reparation may be referred to as financial cost to negate the environmental impact (FCNEI). The FCNEI may be a specific levy applied to a passenger that allows that passenger to be charged only for the calculated environmental impact resulting from their own movements. The FCNEI may be calculated using the environmental impact calculated by the environmental impact determination system and cost information stored in a cost database relating to financial expenditure on environmental repairs tagged by an impact identifier. Further, the FCNEI associated with the specific journey by the passenger may be tagged with a passenger ID for tracking of allocation of FCNEI assets.

In operation S508, the financial offset correlation algorithm controls a transmitter of the server to notify the passenger of the FCNEI due by the passenger. In an example, the FCNEI due may be provided as a cost line item on the travel bill to the passenger. Further, in operation S508, FCNEI payment submitted by the passenger is transmitted to an environmental levy management blockchain as an asset to be stored and tracked. In an example, the asset may be stored and tracked with respect to an identifier of the passenger and/or journey.

In operation S509, the server implementing the environmental levy management blockchain transmits a corrective action request to one or more repair implementers and request bids from the one or more repair implementers. However, aspects of the present disclosure are not limited thereto, such that the server may transmit the corrective action request to a list of pre-approved repair implementers, who may perform corrective actions at pre-arranged fee rates.

In operation S510, the server implementing the environmental levy management blockchain selects, among repair implementers responding to the corrective action request, a repair implementer for performing a corrective action on the environmental damage caused by the journey made by the passenger. In an example, the server may select a repair implementer based on one or more of predefined criteria. The predefine criteria may be response time, review of previous work, amount of experience, price, project timeline or the like. Further, upon the selection of the repair implementer, a relationship between the FCNEI asset, asset passenger ID, and a corrective action ID may be established for tracking of the FCNEI asset with respect to the corrective action to be performed. In addition, locations at which corrective action(s) have been assigned to be employed may be tagged with an identifier, and may be referred to as a location identifier. The location identifier may be used to track any environmental improvements.

In operation S511, a schedule set by or agreed to by the selected repair implementer may be set for performing the corrective action. In an example, the schedule set may provide project objective, location of project, a start date, an end date, duration of work, and other details.

In operation S512, the selected repair implementer performs the corrective action to negate the identified or determined environmental impact/damage caused by the journey made by the passenger. For example, restorative measures or corrective action may include, projects directed to reducing carbon emissions (e.g., clean energy) at certain locations, cosmetic/constructive work performed on various landmarks and structures, repairs performed on roads of iconic geographical areas and the like. In another example, restorative measures or corrective action may use a vehicle provided with an air cleaner (an air cleaning vehicle) to be driven within a location with low air quality. In this example, one or more vehicles detect air quality of their surrounding environment and determine the status of the air quality, and the air cleaning vehicle is driven within the location in which the air quality has been determined as being low. An incentive, for example, the FCNEI asset, may be provided for one or more vehicles gathering the air quality data and the air cleaning vehicle.

In operation S513, upon completion of the corrective action, confirmation of the execution of the corrective action by the repair implementer may be performed. In an example, the environmental improvements may be tracked via sensor data of various vehicles that may be travelling around the location where the corrective action work has been performed. Alternatively, upon completion of the repair work, the repair implementer may transmit a notification of completion of work to the server. Further, the repair implementer may capture images of the completed repair work as evidence of work performed for confirmation. If the server is unable to determine whether the work performed by the repair implementer is satisfactory, the server may instruct a proof collecting device to obtain additional evidence. In an example, the proof collecting device may be a vehicle equipped with sensing technology within a reference distance of a location at which the proof is to be collected, or an unmanned aerial device (e.g., a drone) equipped with sensors for collecting of proof of work. In an example, the proof collecting device may include a processor, a communication circuit and a camera. However, aspects of the present disclosure are not limited thereto, such that the proof collecting device may also be equipped with sample collection device, which may obtain an air sample, water sample, or other samples for further study and/or analysis. Further, the server may deploy the proof collecting device upon notification of completion is received from the repair implementer.

In operation S514, upon confirmation of satisfactory work by the repair implementer, the server implementing the environmental levy management blockchain transfer a portion of the FCNEI assets collected from various passengers and tagged with corresponding passenger IDs to the repair implementer. The FCNEI asset may be transferred via the environmental levy management blockchain to the repair implementer as payment for the corrective action work performed.

In operation S515, upon transfer of the FCNEI assets, the server implementing a corrective action tracking system monitors the movement of the FCNEI asset in the environmental levy management blockchain and generates a passenger report or notification when the FCNEI asset is transmitted to the repair implementer and/or an environmental improvement related to the corrective action is captured or recorded by a proof collecting device or proof collecting device.

In operation S516, the server implementing the corrective action tracking system transmits the passenger report or notification to the passengers associated with the passenger IDs tagged to the FCNEI assets of the work performed.

Figure 6:
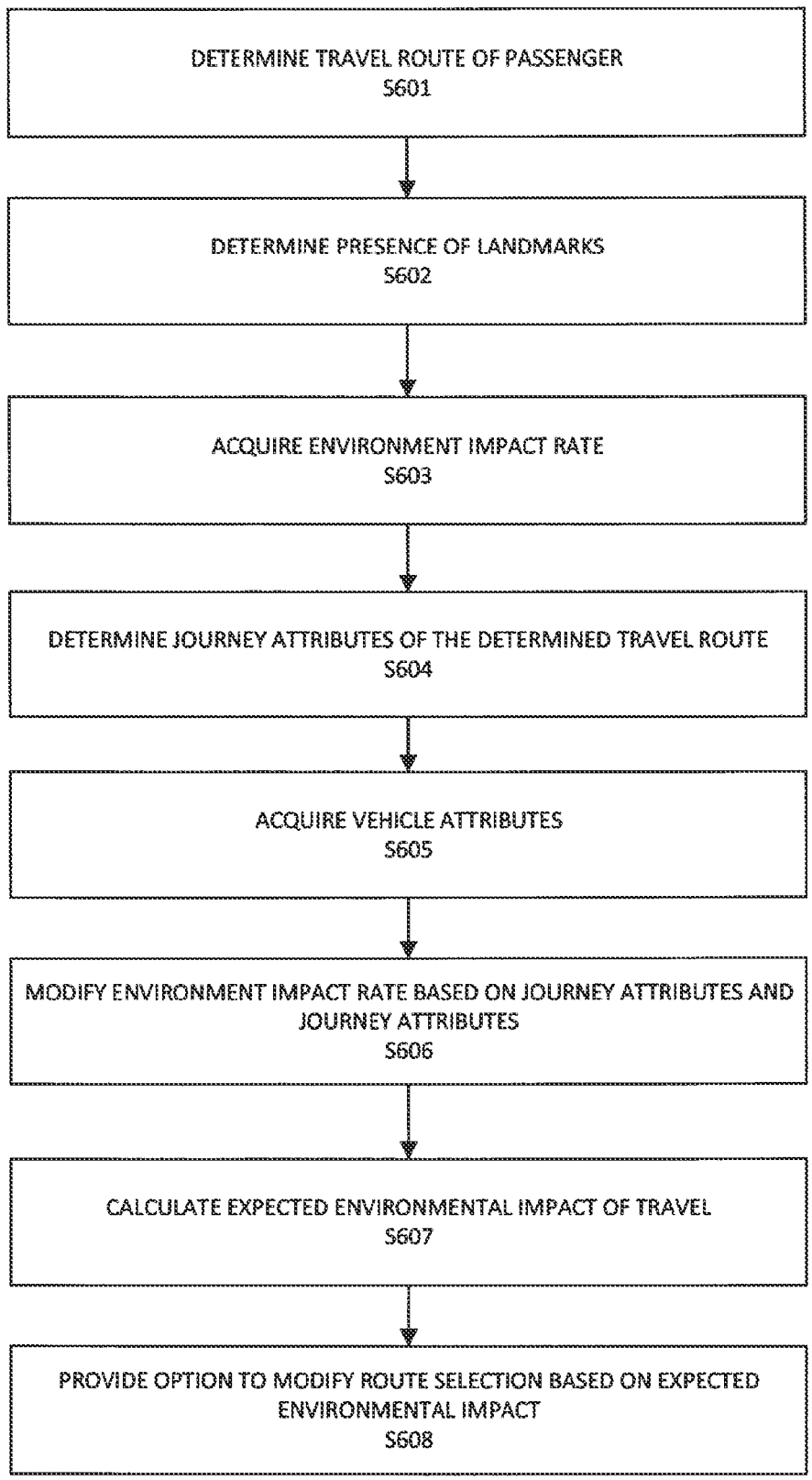
FIG. 6 show a method for selecting a route based on an environmental impact of a journey by a vehicle, according to aspects of the present disclosure.

FIG. 6 show a method for selecting a route based on an environmental impact of a journey by a vehicle, according to aspects of the present disclosure.

In operation S601, a determination of a travel route of a passenger is made on a computing device of the passenger or on a computing component of a vehicle of the passenger. In an example, the travel route may be determined based on starting location, destination, route preferences (e.g., scenic, fastest, shortest, and etc.), fare calculations, environmental impact, and the like. According aspects of the present disclosure, a passenger may be presented with a list of routes available and corresponding environmental impact of each route.

In operation S602, upon determination of a particular route of travel, presence of various landmarks along the particular route may be determined. For example, landmarks may include famous buildings, statutes, parks, shops, historical sites, and the like.

In operation S603, an environmental impact rate may be calculated for the date and location of travel. In an example, the environmental impact rate may determine a correlation between amount of environmental damage (e.g., air quality, structural degradation, building facade color changes and etc.) and vehicle emission. According aspects of the present disclosure, certain environmental damage may be directly caused by the vehicle emission, such as air quality, where as other environmental damage may be indirectly caused by the vehicle emission (e.g., acid rain). The environmental impact rate may be acquired from a server storing a computer model reflecting the environmental impact rate. The computer model reflecting the environmental impact rate may be adjusted in view of current environmental conditions (e.g., air quality level, weather conditions, special events, and etc.). Further, the computer model indicating correlative relationship between the vehicle usage and the environmental impact may be updated intermittently or in real-time via machine learning and/or artificial intelligence. For example, as environmental conditions change with respect to time, an amount of air pollution causing a particular level of environmental damage may change.

In operation S604, journey attributes for the particular route of travel are determined. The journey attributes may refer to information relating to a journey taken or planned by the passenger. In an example, the environmental impact may be modified in view of certain journey attributes, such as expected/actual speed of travel, which may be determined based on route calculation and traffic conditions.

In operation S605, vehicle attributes are acquired. In an example, the vehicle attributes may include, without limitation, weight, make/model, engine size, engine type, fuel type and other attributes. One or more of the vehicle attributes may have modified impact on the environment. For example, a petrol powered vehicle with high carbon dioxide emission may cause a greater damage to the air quality than a hybrid passenger vehicle with minimal carbon dioxide emission. Further, vehicles with larger engine size with less fuel efficiency may emit higher levels of carbon dioxide and other harmful emission to the air.

In operation S606, the acquired environmental impact rate is modified to reflect the vehicle attributes acquired and the journey attributes determined to provide a personalized or tailored environmental impact rate for traveling on the particular route.

In operation S607, expected environmental impact of travel on the particular route for the vehicle selected is determined. In an example, the expected environmental impact may be determined for general air quality, as well as specific impacts on the one or more landmarks as being present on the particular route of travel.

In operation S608, an option to modify a route selection based on the presented expected environmental impact is provided.

Although various aspects of the present disclosure are described with respect to an automobile or other motorized vehicles, such as a motorcycle, bus, service vehicles, delivery vehicles, emergency vehicles, and the like, the present disclosure is not limited thereto, such that vehicles may also include flying devices, such as drones.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a method is provided for identifying an environmental impact caused by a vehicle and tracking of the environmental impact. The method includes receiving, by a receiver of the vehicle and from a mobile device of a passenger, a request for transportation; acquiring, by a sensor of the vehicle, environment data of a current environmental condition; acquiring, by a processor of the vehicle, vehicle attributes of the vehicle; transmitting, by a transmitter of the vehicle and to a server over a network, information of the request for transportation, the environment data and the vehicle attributes; determining, by the server, journey attributes of a journey corresponding to the request for transportation; determining, by the server, environmental impact of the journey based on the environment data, the vehicle attributes, and the journey attributes; and assigning, by the server, an asset identifier to an asset corresponding to the environmental impact.

According to another aspect of the present disclosure, the method further includes assigning, by the server, a passenger identifier corresponding to the environmental impact; transmitting, by the server and to a communication device of a repair implementer, a request for corrective action for the determined environmental impact; receiving, by the server and from the communication device of the repair implementer, an acceptance to perform the corrective action; generating, by the server, an identifier for the corrective action; creating a relationship between the identifier for the corrective action, the asset identifier, and the passenger identifier; and receiving, by the server and from the communication device of the repair implementer, a notification of completion of the corrective action.

According to another aspect of the present disclosure, the method further includes upon receiving, from the communication device of the repair implementer, the notification of completion, transmitting a signal for deploying a proof collection device for collection of evidence of completion.

According to yet another aspect of the present disclosure, the proof collection device is an unmanned aerial device including a camera.

According to still another aspect of the present disclosure, the proof collection device is an unmanned ground vehicle including a camera.

According to another aspect of the present disclosure, the environment data includes at least one of air quality, a weather condition, a building facade color condition, or a road condition.

According to another aspect of the present disclosure, the vehicle attributes include at least one of a weight, an engine size, an engine type, or a fuel type.

According to yet another aspect of the present disclosure, the journey attributes include at least one of route type, average speed of travel, distance of travel or duration of travel.

According to still another aspect of the present disclosure, the journey attributes further include identification of landmarks on a travel route for the journey.

According to a further aspect of the present disclosure, when the notification of completion of the corrective action is received from the communication device of the repair implementer, transferring of the asset corresponding to the environmental impact to the repair implementer and tracking the transferal of the asset corresponding to the environmental impact to the repair implementer with respect to the asset identifier, the identifier for the corrective action, and the passenger identifier.

According to another aspect of the present disclosure, the method further includes transmitting, by the server and to the mobile device of the passenger, a notification of completion of the corrective action performed corresponding to the passenger identifier.

According to another aspect of the present disclosure, the sensor of the vehicle includes at least one of RADAR/LIDAR, a camera, a GPS sensor, a speed sensor, and an air quality monitor.

According to yet another aspect of the present disclosure, the method further includes determining, by the processor of the vehicle, a travel route of the passenger; determining, by the processor of the vehicle, presence of one or more landmarks on the travel route; and display, on a display of the vehicle, the environmental impact for each of the one or more landmarks on the travel route.

According to still another aspect of the present disclosure, the method further includes determining, by the processor of the mobile device of the passenger, a travel route of the passenger; determining, by the processor of the mobile device, presence of one or more landmarks on the travel route; and display, on a display of the mobile device, the environmental impact for each of the one or more landmarks on the travel route.

According to another aspect of the present disclosure, further includes acquiring, from the server, an environment impact rate; and modifying, by the server, the environmental impact rate based on the environment data, the vehicle attributes, and the journey attributes for generating a tailored environmental impact rate corresponding to the journey by the passenger.

According to another aspect of the present disclosure, the environmental impact of the journey is determined based on the environment impact rate.

According to yet another aspect of the present disclosure, the tracking of the transferal of the asset corresponding to the environmental impact is performed using a blockchain.

According to still another aspect of the present disclosure, the vehicle is a member of a vehicle fleet.

According to another aspect of the present disclosure, the method further includes determining a presence of a special event scheduled on the day of the journey.

According to another aspect of the present disclosure, the environmental impact of the journey is adjusted to be higher when the presence of the special event is determined to be scheduled on the day of the journey.

According to another aspect of the present disclosure, a non-transitory computer readable storage medium that stores a computer program, the computer program, when executed by a processor, causing a computer apparatus to perform a process for identifying an environmental impact caused by a vehicle and tracking of the environmental impact. The process includes receiving, by a receiver of the vehicle and from a mobile device of a passenger, a request for transportation; acquiring, by a sensor of the vehicle, environment data of a current environmental condition; acquiring, by a processor of the vehicle, vehicle attributes of the vehicle; transmitting, by a transmitter of the vehicle and to a server over a network, information of the request for transportation, the environment data and the vehicle attributes; determining, by the server, journey attributes of a journey corresponding to the request for transportation; determining, by the server, environmental impact of the journey based on the environment data, the vehicle attributes, and the journey attributes; and assigning, by the server, an asset identifier to an asset corresponding to the environmental impact.

According to yet another aspect of the present disclosure, a computer apparatus for identifying an environmental impact caused by a vehicle and tracking of the environmental impact is provided. The computer apparatus includes a memory that stores instructions, and a processor that executes the instructions, in which, when executed by the processor, the instructions cause the processor to perform a set of operations. The set of operations includes receiving, by a receiver of the vehicle and from a mobile device of a passenger, a request for transportation acquiring, by a sensor of the vehicle, environment data of a current environmental condition acquiring, by a processor of the vehicle, vehicle attributes of the vehicle; transmitting, by a transmitter of the vehicle and to a server over a network, information of the request for transportation, the environment data and the vehicle attributes; determining, by the server, journey attributes of a journey corresponding to the request for transportation; determining, by the server, environmental impact of the journey based on the environment data, the vehicle attributes, and the journey attributes; and assigning, by the server, an asset identifier to an asset corresponding to the environmental impact.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The present application claims the benefit of U.S. Provisional Patent Application No. 62/735,234 filed on Sep. 24, 2018. The entire disclosure of the above-identified application, including the specifications, drawings and/or claims, is incorporated herein by reference in its entirety.

The invention claimed is:

1. A method for identifying an environmental impact caused by a vehicle and tracking of the environmental impact, the method comprising:
   receiving, by a receiver of the vehicle and from a mobile device of a passenger, a request for transportation;
   acquiring, by a sensor of the vehicle, environment data of a current environmental condition; acquiring, by a processor of the vehicle, vehicle attributes of the vehicle;
   transmitting, by a transmitter of the vehicle and to a server over a network, information of the request for transportation, the environment data and the vehicle attributes;
   determining, by the server, journey attributes of a journey corresponding to the request for transportation;
   determining, by the server, environmental impact of the journey based on the environment data, the vehicle attributes, and the journey attributes;
   assigning, by the server, an asset identifier to an asset corresponding to the environmental impact;
   assigning, by the server, a passenger identifier corresponding to the environmental impact;
   transmitting, by the server and to a communication device of a repair implementer, a request for corrective action for the determined environmental impact;
   receiving, by the server and from the communication device of the repair implementer, an acceptance to perform the corrective action;
   generating, by the server, an identifier for the corrective action;
   creating a relationship between the identifier for the corrective action, the asset identifier, and the passenger identifier;
   when a first notification of completion of the corrective action is received from the communication device of the repair implementer, transferring of the asset corresponding to the environmental impact to the repair implementer and tracking the transferal of the asset corresponding to the environmental impact to the repair implementer with respect to the asset identifier, the identifier for the corrective action, and the passenger identifier;

receiving, by the server and from the communication device of the repair implementer, a notification of completion of the corrective action;

transmitting, by the server and to the mobile device of the passenger, a notification of completion of the corrective action performed corresponding to the passenger identifier; and upon receiving, from the communication device of the repair implementer, the first notification of completion, transmitting a signal for deploying a proof collection device for collection of evidence of completion.

2. The method of claim 1, wherein the proof collection device is an unmanned aerial device including a camera.

3. The method of claim 1, wherein the proof collection device is an unmanned ground vehicle including a camera.

4. The method of claim 1, wherein the environment data includes at least one of air quality, a weather condition, a building facade color condition, or a road condition.

5. The method of claim 1, wherein the vehicle attributes include at least one of a weight, an engine size, an engine type, or a fuel type.

6. The method of claim 1, wherein the journey attributes include at least one of a route type, an average speed of travel, a distance of travel or a duration of travel.

7. The method of claim 6, wherein the journey attributes further include identification of landmarks on a travel route for the journey.

8. The method of claim 1, wherein the sensor of the vehicle includes at least one of RADAR/LIDAR, a camera, a GPS sensor, a speed sensor, and an air quality monitor.

9. The method of claim 1, further comprising:

determining, by the processor of the vehicle, a travel route of the passenger;

determining, by the processor of the vehicle, presence of one or more landmarks on the travel route; and displaying, on a display of the vehicle, the environmental impact for each of the one or more landmarks on the travel route.

10. The method of claim 1, further comprising:

determining, by the processor of the mobile device of the passenger, a travel route of the passenger;

determining, by the processor of the mobile device, presence of one or more landmarks on the travel route; and displaying, on a display of the mobile device, the environmental impact for each of the one or more landmarks on the travel route.

11. The method of claim 1, further comprising:

acquiring, from the server, an environment impact rate; and modifying, by the server, the environmental impact rate based on the environment data, the vehicle attributes, and the journey attributes for generating a tailored environmental impact rate corresponding to the journey, wherein the environmental impact of the journey is determined based on the environment impact rate.

12. The method of claim 1, wherein the tracking of the transfer of the asset corresponding to the environmental impact is performed using a blockchain.

13. The method of claim 1, wherein the vehicle is a member of a vehicle fleet.

14. The method of claim 13, further comprising determining a presence of a special event scheduled on a day of the journey, wherein the environmental impact of the journey is adjusted to be higher when the presence of the special event is determined to be scheduled on the day of the journey.

* * * * *